March 3, 1970

C. DIEHL 3,497,962

METHOD AND MEANS FOR MINIMIZING HORIZONTAL ACCELERATIONS
IN SHIPBOARD VERTICAL PENDULA

Filed Nov. 6, 1967

INVENTOR.
CONRAD DIEHL
BY Philip Schneider
Louis B. Applebaum
ATTORNEYS

United States Patent Office 3,497,962
Patented Mar. 3, 1970

3,497,962
METHOD AND MEANS FOR MINIMIZING HORIZONTAL ACCELERATIONS IN SHIPBOARD VERTICAL PENDULA
Conrad Diehl, Rochester, N.Y., assignor, by mesne assignments, to the United States of America as represented by the Secretary of the Navy
Filed Nov. 6, 1967, Ser. No. 680,684
Int. Cl. G01c 9/08
U.S. Cl. 33—220       3 Claims

ABSTRACT OF THE DISCLOSURE

A pendulum, suspended from the frame of a vehicle which moves in three-dimensional space and located above roll and pitch axes of the vehicle, is fastened to the frame by a pair of opposingly disposed, horizontal springs which act to damp out the horizontal acceleration which would otherwise displace the pendulum from its normal vertical position. The pair of roll springs, for example, are disposed on opposite sides of the pendulum in a plane perpendicular to the roll axis of the vehicle. The spring rate is calculable from a formula once the motional frequency which is to be cancelled is selected and the pendulum's physical dimensions and location have been fixed.

---

This invention relates to methods and means for improving the vertical stability of a pendulum and especially for methods and means for minimizing the effects of horizontal accelerations on a pendulum.

Pendula can be used as component parts of stable platforms which are needed for inertial navigation aboard ships and airplanes, for example. An important function of pendula is the sensing of acceleration of the vehicle and, in this application, they are called pendulous accelerometers. Servomechanisms must be used to control their stability, however.

An object of the present invention is to provide simple, inexpensive, highly reliable means for maintaining the vertical position of a pendulum mounted on a vehicle moving in three-dimensional space despite horizontal accelerational forces, which act on the pendulum without the use of a gyroscopic element and servomechanism controls.

The objects and advantages of the present invention are accomplished by fastening a pair of oppositely disposed springs horizontally between the pendulum and a frame grounded to the vehicle which carries the pendulum. The stiffness of the springs is selected to cancel the effect of the horizontal acceleration forces at one frequency of the vehicle's roll motion and at one frequency of the vehicle's pitch motion (the zero response frequencies). The reaction of the pendulum to horizontal acceleration forces over a band of frequencies in the region of the zero response frequencies is thereby greatly improved.

Other objects and advantages will appear from the following description of an example of the invention, and the novel features will be particularly pointed out in the appended claims.

Figure 1:
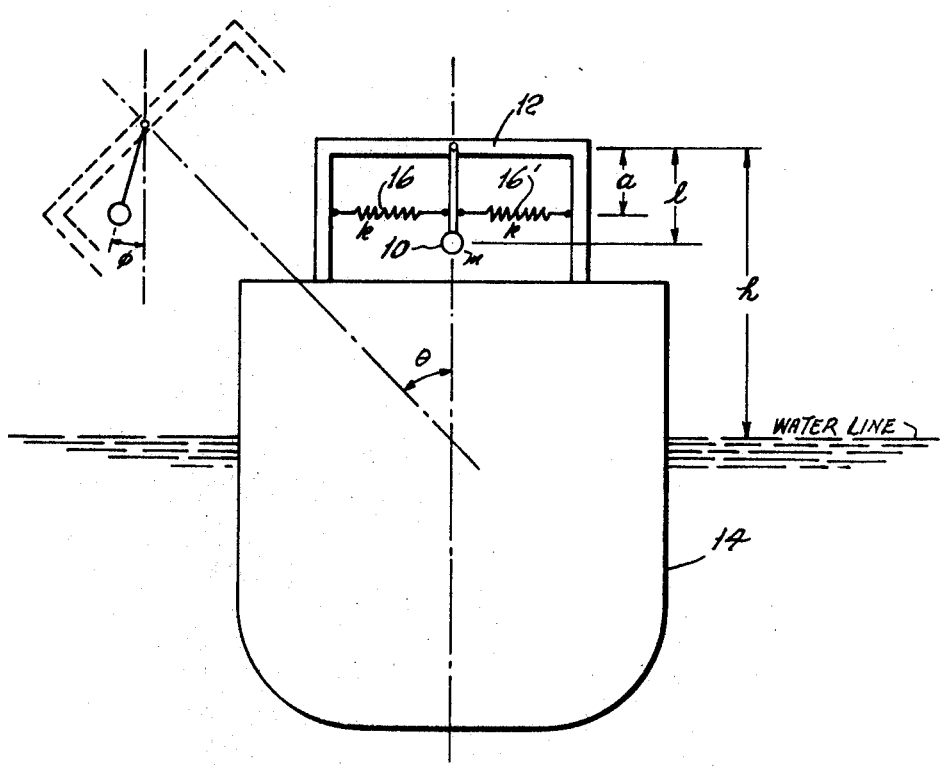
Figure 2:
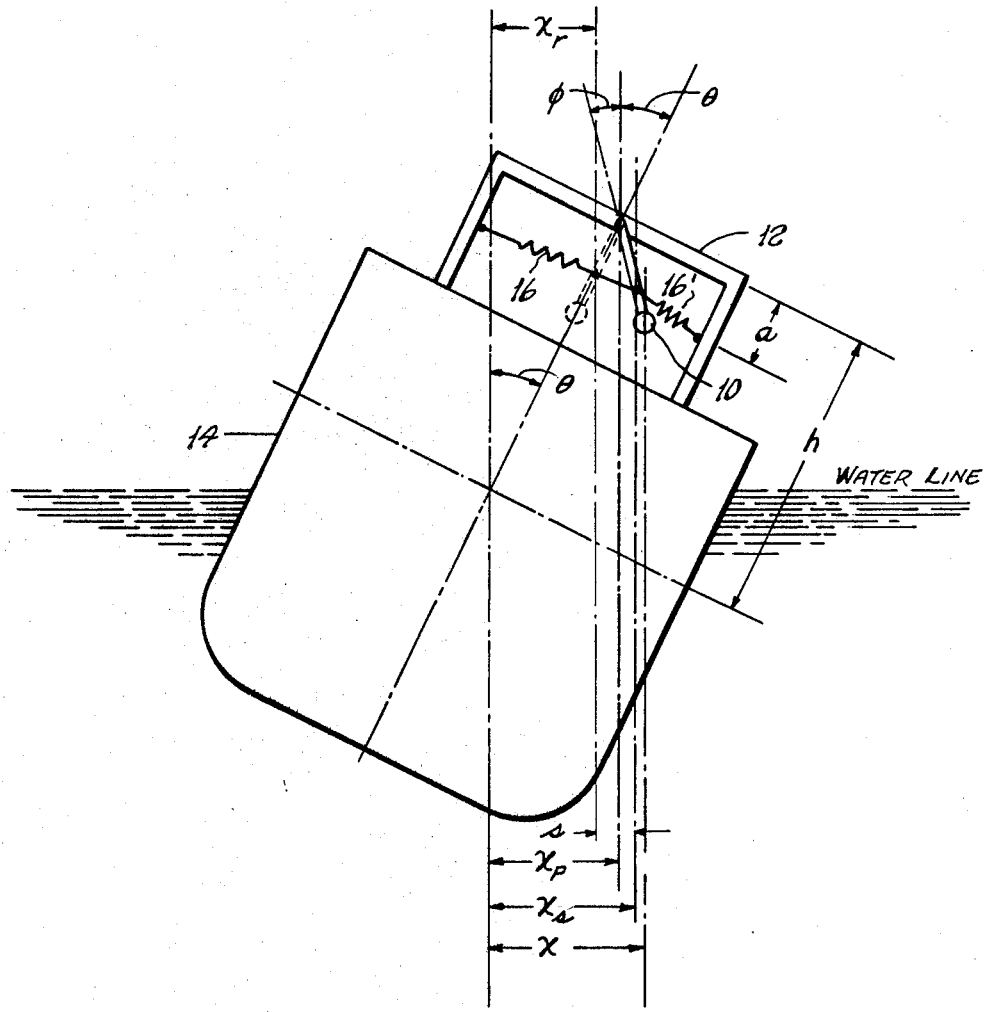

In the accompanying drawings:

FIG. 1 is a schematic illustration of the invention with the ship in a centered position; and FIG. 2 is a schematic illustration of certain parameters when the ship has rolled to starboard.

FIG. 1 shows the pendulum 10 mounted on a frame, or gimbal, 12 which is affixed to the ship 14. The pendulum 10 is located above the roll and pitch axes of rotation of the ship 14. The biasing springs 16 and 16' shown in the figure are the springs which cancel, at one roll frequency, the horizontal forces due to the roll of the ship 14. A fore-and-aft disposed set of springs (not shown) are used to cancel out the effect of ship pitch at one pitch frequency.

A stabilized pendulum has been designed for maintaining the verticality of a ship-mounted pendulum under sea state 3 conditions.

If the sea state is 3, the ship may roll 10 degrees from the vertical with a roll period of up to 5 or 6 seconds or more, for example.

It has been found that the following formula holds for a spring-biased pendulum such as that shown in schematic form in the drawing:

$$\frac{\phi_m}{\theta_m} = -\frac{h}{L_{eq}} \left[ \frac{\frac{1}{T^2} - \frac{g}{4\pi^2 h}\left(\frac{ka^2}{Wl}\right)}{\frac{1}{T^2} - \frac{g}{4\pi^2 L_{eq}}\left(1 + \frac{ka^2}{Wl}\right)} \right] \quad \text{(I)}$$

where $\phi_m$ = maximum pendulum angular output or maximum angular deviation of pendulum axis from the vertical
$\phi_m$ = maximum vehicle angular input or maximum roll or pitch angle of vehicle
$h$ = height of pendulum axis above roll or pitch axis of vehicle
$L_{eq}$ = equivalent length of pendulum
$T$ = desired period of the input
$g$ = acceleration due to gravity
$Wl$ = gravity moment of pendulum
$k$ = spring rate of each set of springs
$a$ = moment arm over which the springs act.

It is desired that the ratio $\phi_m/\phi_m$ be a minimum and this occurs when the numerator of the equation is zero. After the pendulum location is determined and a pendulum is chosen, the variables in the above equation are $a$, the moment arm over which the biasing springs act and $k$, the spring rate. Setting the numerator equal to zero, the following equations are obtained for the roll springs:

$$a_r = \frac{2\pi}{T_r}\sqrt{\frac{h_r}{g}\left(\frac{Wl}{k}\right)} \quad \text{(II)}$$

$$k = \frac{4\pi^2 h_r(Wl)}{g(a_r T_r)^2} \quad \text{(III)}$$

where $a_r$ = roll spring moment arm (inches)
$k$ = spring rate (lb./in.)
$T_r$ = selected roll period (seconds)
$Wl$ = gravity moment (inch-lbs.)
$g$ = 386 in./sec.$^2$
$h_r$ = height of pendulum axis above roll centerline (inches)

The last four factors are fixed when the pendulum is installed in a specific location. The first two can be varied but it is easiest to adjust the springs for the desired rate. Therefore, Equation III will generally be employed to determine the necessary spring rate.

The adjustment of the spring rate provides cancellation at one roll frequency and vastly improved stability of the pendulum over a band of frequencies centered about this zero-response frequency.

It is of course apparent that a pair of springs mounted fore-and-aft of the pendulum can be adjusted to cancel out a single pitch frequency of the ship. Substitutions of $a_p$ (pitch spring moment arm), $T_p$ (desired pitch period) and $h_p$ (height of pendulum axis about pitch centerline of ship) are made for $a_r$, $T_r$ and $h_r$ respectively, in the formulas.

The pendulum, springs and frame can be viewed as a stabilization platform and the derivation of its transfer function (the equivalent of Equation I herein but in slightly different form) is provided below. The action of the stabilization platform under ship roll and pitch is shown in FIGS. 1 and 2. FIG. 1 shows the platform centered and FIG. 2 shows the platform subject to roll or pitch motion. The symbol definition is a follows:

$m$ = mass of pendulum bob
$k$ = biasing spring constant
$a$ = biasing spring moment arm
$l$ = pendulum length
$h$ = height of pendulum pivot above roll or pitch center
$x_r$ = offset of biasing spring center position
$\phi$ = angle of pendulum with local vertical
$\theta$ = angle of ship roll or pitch
$x_p$ = offset of pendulum pivot
$x_s$ = offset of biasing spring connection to pendulum
$x$ = offset of pendulum mass
$s$ = biasing spring deflection Assuming that the pendulum is a simple and not a compound pendulum, and assuming kinematic relationships that $\theta = \sin\theta = \tan\theta$, the following occurs under rolling or pitching action:

$$x_p = h\theta$$
$$x_s = (h-a)\theta$$
$$x_s = x_p + a\theta = h\theta + a\theta$$
$$x = x_p + l\theta = h\theta + l\theta$$
$$s = a(\phi + \theta)$$

During a roll or pitch disturbance the forces acting on the pendulum are shown in FIG. 2. Applying Newton's Law, the following can be written:

$$-mg\phi - K\frac{a}{l}s = m\frac{d^2x}{dt^2} \quad (IV)$$

Applying the kinematic relationships:

$$-mg\phi - K\frac{a^2}{l}(\phi+\theta) = m\left(h\frac{d^2\theta}{dt^2} + l\frac{d^2\phi}{dt^2}\right) \quad (V)$$

Assuming the steady state sinusoidal motions the following transfer is obtained:

$$\frac{\phi_m}{\theta_m} = -\frac{h}{l}\frac{w^2 + \frac{Ka^2}{mlh}}{w^2 - \frac{g}{l}\left(1 + \frac{Ka^2}{mgl}\right)} \quad (VI)$$

where $w$ = sinusoidal input angular frequency = $T/_2\pi$
It will be noted that if the numerator $$w^2 + \frac{Ka^2}{mlh}$$

is zero, the ratio $\phi_m/\theta_m$ is zero and under these circumstances the platform is motionless irrespective of the amount of ship's pitch or roll motion. This is the criteria for a stable platform.

It will be understood that various changes in the details, materials, and arrangements of parts (and steps), which have been herein described and illustrated in order to explain the nature of the invention, may be made by those skilled in the art within the principle and scope of the invention.

I claim:
1. A pendulum stabilized against horizontal accelerational forces imposed on it by the movements of the vehicle in which it is mounted, a vehicle which may effectively pivot about a plurality of motional axes, comprising:
a pendulum;
a framework attached to said vehicle, said pendulum being pivotably suspended from said framework; and
a pair of springs, each being horizontally disposed on an opposite side of said pendulum in a plane perpendicular to one of the motional axes of the vehicle,
each spring being fastened to said framework at one end and said pendulum at the other end,
the spring rate of said springs being tuned to cancel out movement of said pendulum at one frequency of the vehicle's motion, said movement resulting from accelerational forces in said plane perpendicular to said motional axis of the vehicle

2. A pendulum as in claim 1, wherein the spring rate is calculated from the formula:

$$k = \frac{4\pi^2 h_r(Wl)}{g(a_r T_r)^2}$$

where
$k$ = spring rate in lbs./in.
$a_r$ = roll spring moment arm in inches
$T_r$ = selected roll period in seconds
$Wl$ = gravity moment in inch-lbs.
$g$ = acceleration due to gravity in inches/sec.$^2$
$h_r$ = height of pendulum axis above the roll centerline of the vehicles in inches 3. A pendulum as in claim 1, wherein the spring rate is calculated from the formula:

$$k = \frac{4\pi^2 h_p(Wl)}{g(a_p T_p)^2}$$

where
$k$ = spring rate in lbs./in.
$a_p$ = pitch spring moment arm in inches
$T_p$ = desired pitch period in seconds
$Wl$ = gravity moment in inch-lbs.
$g$ = acceleration due to gravity in inches/sec.$^2$
$h_p$ = height of pendulum axis above the pitch centerline of the vehicle in inches.

References Cited

UNITED STATES PATENTS

| 989,958 | 4/1911 | Frahm | 33—220 |
| 2,838,137 | 6/1958 | Wallerstein | 188—1 |

FOREIGN PATENTS 316,167, 1/1920 Germany.

LEONARD FORMAN, Primary Examiner
DENNIS A. DEARING, Assistant Examiner